United States Patent Office 3,239,309
Patented Mar. 8, 1966

3,239,309
PREPARATION OF DICYAN
Herbert Zima, Brig, Switzerland, and Wilhelm Gruber, Darmstadt, Germany, assignors to Rohm & Haas G.m.b.H., Darmstadt, Germany
No Drawing. Filed Mar. 29, 1963, Ser. No. 272,499
Claims priority, application Germany, Sept. 18, 1959, R 26,389; Aug. 19, 1960, R 28,514; Jan. 13, 1961, R 29,451
10 Claims. (Cl. 23—151)

This application is a continuation-in-part of copending applications Serial No. 56,670, filed September 19, 1960, now abandoned, and Serial No. 165,238, filed January 9, 1962, now abandoned.

This invention relates to methods for making dicyan from hydrogen cyanide.

U.S. Patent 3,031,265, granted April 24, 1962, teaches the preparation of dicyan from hydrogen cyanide by passing hydrogen cyanide at a temperature between 300° and 800° C. over a catalyst comprising a metal of the sixth subgroup of the Periodic System, a platinum metal of the eighth group of the Periodic System, mixtures or alloys of these metals, and/or an oxide of a metal of the fourth, fifth, or sixth subgroups of the Periodic System. Optionally, minor amounts of a metal of Group IB of the Periodic System may be included in the catalyst. In this reaction hydrogen cyanide is smoothly converted to dicyan and hydrogen by the catalysts, which show a surprisingly high selectivity in their action. In this process, it has proved particularly advantageous to use catalysts comprising a carrier substance and, for example, one of the aforementioned metals. The best results are obtained with mixed catalysts which can be prepared, for example, by precipitating a platnium metal on one of the oxides named or, preferably, on kieselguhr, as a carrier. Also, catalysts comprising an alloy of two or more platinum metals, such as an alloy of about 95–99.5 percent platinum, balance palladium, shows a particularly high selective action. It has also proved advantageous to dilute the hydrogen cyanide to be treated by the aforementioned process with an inert gas such as nitrogen, for example, in a volume ratio of 1:1.

With the process described above, high yields of up to 98 percent can be obtained. However, the amount of dicyan formed on each pass through the reactor is relatively small. Also, the lifetime of the catalyst is not fully satisfactory.

As taught in detail in American Patent 2,712,493 and in German Patent 1,040,521, another well-known process for preparing dicyan from hydrogen cyanide comprises the oxidation of hydrogen cyanide using a silver catalyst. In German Patent 1,056,101, it is taught that a catalyst consisting at least in part of gold can be used in place of the silver catalyst of German Patent 1,040,521. The disadvantage of such an oxidation process is that cyanic acid is produced in considerable amount with dicyan, and the process entails difficulties in the separation of the two products produced.

It has now been found that the conversion of hydrogen cyanide using the catalysts mentioned above can be considerably improved in many respects if oxygen or air is mixed with the hydrogen cyanide in amounts between 15 percent and 140 percent of the amount of oxygen necessary to oxidize the hydrogen cyanide present according to the reaction:

$$2HCN + \tfrac{1}{2}O_2 \rightarrow (CN)_2 + H_2O$$

Employing this process, the amount of dicyan formed per pass can be raised three to five fold over that obtained in the processes in the prior art, and the full catalyst efficacy can be retained considerably longer. It is particularly surprising that the oxidation reaction occurring concurrently with the thermal decomposition of hydrogen cyanide produces dicyan exclusively. In contrast to all other oxidation processes heretofore known, no cyanic acid is produced, and difficulties with the separation of dicyan and cyanic acid are obviated. Further, the conversion of hydrogen cyanide to dicyan and hydrogen is an endothermic reaction. According to the process of the invention, a considerable portion of the energy required is furnished by the oxidation of a portion of the hydrogen cyanide.

A catalyst comprising 99.1 percent of platinum and 0.9 percent of palladium is especially preferred in carrying out the process of the present invention, particularly when the metals mentioned are employed in the form of precipitates on a carrier of silica gel or of kieselguhr. Alternatively, the metallic catalysts of the invention can be formed into a wire mesh over which the reactant gases are passed. Wire mesh composed of alloys of the platinum metals, e.g., an alloy of 99 percent platinum and 1 percent palladium, and alloys of platinum metals with metals of Group VIB are outstanding from the point of view of catalytic efficacy and life. Particularly good results are obtained when hydrogen cyanide and from about 60 to about 120 percent of the oxygen required for the reaction indicated earlier are passed over a wire gauze catalyst at temperatures above 600° C. to about 800° C.

The process of the invention must be distinguished from other reactions involving an oxidation of hydrogen cyanide. For example, in an excess of air or oxygen, hydrogen cyanide is oxidized with formation of nitrogen oxides:

$$2HCN + 5/2 O_2 \rightarrow 2CO + H_2O + 2NO$$

In the process of the present invention, no nitrogen oxides are formed.

A better understanding of the invention and its many advantages can be had by referring to the following specific examples, given by way of illustration.

EXAMPLE 1

Experiment 1

10 grams of a catalyst of 99.1% platinum and 0.9% palladium precipitated on a silica gel-kieselguhr carrier were placed in a vertical, electrically-heated quartz tube having an inside diameter of 22 mm. The level of the catalyst in the tube was about 60 mm. A 1:1 volumetric mixture of hydrogen cyanide and nitrogen, preheated to 60° C., was passed over the catalyst at 650° C. The spatial velocity of the hydrogen cyanide portion was 336/hour. The yield of dicyan, calculated on the quantity of hydrogen cyanide converted, climbed during the first hour from 46% to 98% and slowly decreased after about 8 hours. In an experimental run lasting 10 hours, 2.09 grams of dicyan were prepared from 90.2 grams of hydrogen cyanide.

Experiment 2

Using the same arrangement as in Experiment 1, except for minor changes in the manner of heating the catalyst, a portion of the diluent nitrogen was replaced by air in such an amount that the gas mixture led to the catalyst consisted of 50 volume percent HCN, 4 volume percent $O_2$ and 46 volume percent $N_2$. The oxygen content corresponds to about 30% of the oxygen necessary for a complete oxidation of hydrogen cyanide to dicyan and water. In an experimental run lasting 10 hours, 8.36 grams of dicyan were prepared from 90.2 grams of HCN, that is, with a practically identical selectivity, the addition of oxygen caused about a four-fold increase in conversion. Continuation of the experiment for an additional 10 hours indicated that the efficiency of the catalyst after a total 20 hour period of operation was practically unchanged, whereas the same catalyst employed under the conditions of Experiment 1 began to show decreasing catalytic efficiency after only 8 hours.

EXAMPLE 2

A catalyst containing about 20% $ZrO_2$ was prepared by contacting 22 grams of $ZrO(NO_3)_2 \cdot 2H_2O$ with a corresponding amount of silica gel-kieselguhr carrier, which was then dried and finally glowed for 4 hours at 760° C. in a reaction tube in a nitrogen atmosphere. A gas mixture of hydrogen cyanide (150 ml./min.), nitrogen (138.7 ml./min.), and oxygen (11.3 ml./min.) was passed over 12 grams of this catalyst at 650° C. At a constant conversion of about 9%, the selectivity rose from 50% to 92% dicyan. If the same reaction is conducted without the addition of oxygen to the gas mixture, the conversion is 3.5% and the selectivity, on the average, is below 50% dicyan.

EXAMPLE 3

A 40% chromium oxide-tungsten oxide mixed catalyst was prepared by dissolving 15.5 grams of $$3(NH_4)_2O \cdot 7WO_3 \cdot 6H_2O$$

in 500 ml. 15% ammonia and mixing therewith a solution of 26.7 grams of $(NH_4)_2CrO_4$. The combined solutions were contacted with 40 grams of kieselguhr and the resulting mud was dried. The mass was then glowed for 5 hours at 400–430° C. in an air stream to decompose the salts. A gas mixture of hydrogen cyanide (150 ml./min.), nitrogen (138.7 ml./min.), and oxygen (11.3 ml./min.) was passed over 12 grams of this catalyst at 530° C. The hydrogen cyanide conversion rose from 16.8% to 24% in the first hour, and the selectivity rose from 56.2% to 92% in the same period. The conversion and selectivity remained practically constant through an experimental period of 5 additional hours.

EXAMPLE 4

A gaseous mixture of hydrogen cyanide, oxygen and nitrogen was passed downwardly through a quartz tube having an internal diameter of 22 mm., provided midway between the ends with two closely adjacent (spaced apart about one mm.) gauzes of 99 percent platinum and 1 percent palladium having 1000 meshes per $cm.^2$, and electrically heated for a distance of 10 cm. to a temperature above 600° C.

The results obtained with the same catalyst gauze, at the same period of catalyst life (eight hours after commencement of the reaction), with various concentrations of oxygen and at a catalyst gauze temperature of 650° C. are tabulated below. In each run, the rate of feed of hydrogen cyanide was 150 ml. (0.181 gram) per minute (measured at 40° C.), and the amount of nitrogen was such that volumetric rate of oxygen plus nitrogen approximately equalled the volumetric rate of hydrogen cyanide.

| Run No. | $O_2$, percent theoretical | HCN, percent converted in one pass | Yield of dicyan, percent in one pass |
| --- | --- | --- | --- |
| 1 | 10 | 7.35 | 5.8 |
| 2 | 20 | 14.0 | 10.4 |
| 3 | 30 | 20.8 | 15.6 |
| 4 | 40 | 25.0 | 19.2 |
| 5 | 60 | 36.2 | 26.6 |
| 6 | 80 | 43.8 | 32.0 |
| 7 | 100 | 52.4 | 39.3 |
| 8 | 120 | 71.2 | 54.3 |
| 9 | 140 | 72.9 | 51.0 |

Similar results were obtained with a 95:5 platinum-palladium catalyst gauze and a pure platinum gauze.

EXAMPLE 5

385 liters per hour of a gas mixture comprising 225 liters of HCN and 160 liters of air (measured at 20° C. and 760 mm./Hg) were passed over five superimposed wire gauzes (676 meshes per $cm.^2$) of a 90:10 platinum-rhodium alloy at a temperature of 750° C. The amount of oxygen in the quantity of air employed corresponds with 60 percent of the amount of oxygen required for the reaction:

$$2HCN + \tfrac{1}{2}O_2 \rightarrow (CN)_2 + H_2O$$

In a 120 hour run, an average HCN conversion of 35.8 percent was achieved. The yield of dicyan, calculated on the total amount of HCN, was 34.5 percent, or 96.4 percent of the HCN reacted.

EXAMPLE 6

A tungsten catalyst was prepared by dissolving 36.6 grams of ammonium paratungstate $(NH_4)_6W_7O_{24} \cdot 6H_2O$ in 1 liter of a 15 percent aqueous solution of methylamine. 50 grams of kieselguhr were added to the solution, and the resulting mixture was brought to the consistency of a thick sludge by heating on a steam bath with stirring. The moist mass was formed into granules which were then dried. The dry granules were first heated at 400° C. for 10 hours, and then reduced by heating at 810° C. in a stream of hydrogen.

15 grams of the catalyst so prepared were packed into a quartz tube as described in Example 1. A gas mixture of hydrogen cyanide (150 ml./min.) and air (107 ml./min.) was passed over this catalyst at 600° C. There was a hydrogen cyanide conversion of 33 percent, a yield of dicyan of 28 percent, that is a selectivity of 85 percent.

EXAMPLE 7

A platinum-tungsten catalyst was prepared by dissolving ammonium paratungstate in concentrated aqueous ammonia with heating, and similarly dissolving ammonium chloroplatinate in a boiling 20 percent aqueouss olution of ammonia. Portions of the two solutions were mixed to give a third solution containing 11.91 grams of dissolved platinum metal and 0.59 gram of dissolved tungsten. 50 grams of kielselguhr were added to this solution, and the resulting mixture was heated on a steam bath with stirring until a thick sludge resulted. After granulation and drying, the catalyst was heated to redness for 12 hours in a stream of hydrogen at 810° C.

Over 15 grams of the catalyst there was passed the same gas mixture as described in Example 6. The reaction temperature was 600° C. There was a hydrogen cyanide conversion of 38 percent and a yield of dicyan of 35 percent corresponding a selectivity of 92 percent.

Although specific embodiments have been shown and described, it is to be understood that they are illustrative, and are not to be construed as limiting on the scope and spirit of the invention.

What is claimed is:

1. In a process for the preparation of dicyan by passing hydrogen cyanide at a temperature between 300° C. and 800° C. over a catalyst consisting of at least one platinum metal of Group VIII of the Periodic System, the improvement of adding to the hydrogen cyanide to be treated from 15 to 140 percent of the stoichiometric amount of oxygen necessary for the oxidation of the hydrogen cyanide content of the resulting mixture to dicyan according to the reaction $$2HCN + \tfrac{1}{2}O_2 \rightarrow (CN)_2 + H_2O$$

2. A process as in claim 1 wherein the oxygen-hydrogen cyanide gas mixture is additionally diluted with an inert gas.

3. A process as in claim 1 wherein said catalyst is deposited on a carrier.

4. A process as in claim 1 wherein said catalyst is pure platinum.

5. A process as in claim 1 wherein said catalyst consists of an alloy of platinum and palladium.

6. A process as in claim 1 wherein said catalyst consists of 95–99 percent platinum, balance palladium.

7. A process as in claim 1 wherein said catalyst consists of 99.1 percent platinum, balance palladium.

8. A process according to claim 7 wherein said catalyst is deposited on kieselguhr as a carrier.

9. A process as in claim 1 wherein the amount of oxygen employed is between about 60 and 120 percent of the stoichiometric amount.

10. A process as in claim 1 wherein said temperature is between above 600° C. and 800° C.

References Cited by the Examiner
UNITED STATES PATENTS 3,065,057   11/1962   Geerts et al. _____ 23—151

MAURICE A. BRINDISI, *Primary Examiner.*